US011216413B1

(12) United States Patent
Nanda et al.

(10) Patent No.: US 11,216,413 B1
(45) Date of Patent: Jan. 4, 2022

(54) PROCESSING PLATFORM CONFIGURED FOR DATA SET MANAGEMENT UTILIZING METADATA-BASED DATA SET OPERATIONAL SIGNATURES

(71) Applicant: EMC IP Holding Company LLC, Hopkinton, MA (US)

(72) Inventors: Nihar Nanda, Acton, MA (US); David Stephen Reiner, Lexington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 376 days.

(21) Appl. No.: 15/654,045

(22) Filed: Jul. 19, 2017

(51) Int. Cl.
| G06F 16/00 | (2019.01) |
| G06F 16/11 | (2019.01) |
| G06N 20/00 | (2019.01) |
| G06F 16/16 | (2019.01) |
| G06F 16/907 | (2019.01) |

(52) U.S. Cl.
CPC .......... *G06F 16/122* (2019.01); *G06F 16/164* (2019.01); *G06F 16/907* (2019.01); *G06N 20/00* (2019.01)

(58) Field of Classification Search
CPC .... G06F 16/122; G06F 16/907; G06F 16/164; G06F 17/30011; G06F 21/6227; G06F 17/30067; G06F 17/30286; G06N 20/00; G06Q 10/10
See application file for complete search history.

(56) References Cited

U.S. PATENT DOCUMENTS

| 8,838,556 | B1 | 9/2014 | Reiner et al. |
| 9,141,908 | B1 | 9/2015 | Reiner et al. |
| 2009/0204470 | A1* | 8/2009 | Weyl ...................... G06Q 10/06 705/7.13 |
| 2012/0150818 | A1* | 6/2012 | Vijayan Retnamma ................... G06F 11/1456 707/679 |

(Continued)

OTHER PUBLICATIONS

U.S. Appl. No. 14/487,520 filed in the name of Nihar Nanda et al. on Sep. 16, 2014 and entitled "Data Set Virtual Neighborhood Characterization, Provisioning and Access."

(Continued)

*Primary Examiner* — Ashish Thomas
*Assistant Examiner* — Suman Rajaputra
(74) *Attorney, Agent, or Firm* — Ryan, Mason & Lewis, LLP

(57) ABSTRACT

An apparatus in one embodiment comprises a processing platform having one or more processing devices. The processing platform is configured to obtain metadata characterizing a plurality of data sets, to generate data set operational signatures for respective ones of at least a subset of the data sets based at least in part on the obtained metadata, and to automatically perform one or more management operations for each of one or more of the data sets based at least in part on respective corresponding ones of the data set operational signatures. The processing platform may be further configured to implement a target signature for a particular data set management policy, and to automatically perform a particular management operation for a given one of the data sets based at least in part on a result of a comparison of the data set operational signature for the given data set to the target signature.

20 Claims, 6 Drawing Sheets

(56) References Cited

U.S. PATENT DOCUMENTS

| | | | |
|---|---|---|---|
| 2016/0078245 A1* | 3/2016 | Amarendran | G06F 21/6218 |
| | | | 713/193 |
| 2017/0364850 A1* | 12/2017 | Johnston | G06Q 10/06313 |
| 2018/0165612 A1* | 6/2018 | Saxena | G06N 20/00 |
| 2018/0246973 A1* | 8/2018 | Zhao | G06F 16/9535 |

OTHER PUBLICATIONS

E.J. Richardson et al., "Meta4: A Web Application for Sharing and Annotating Metagenomic Gene Predictions Using Web Services," Frontiers in Genetics, Methods Article, Sep. 5, 2013, pp. 1-6, vol. 4, Article 168.

U.S. Appl. No. 15/074,597 filed in the name of David Stephen Reiner et al. on Mar. 18, 2016 and entitled "Data Set Discovery Engine Comprising Relativistic Retriever."

U.S. Appl. No. 15/497,484 filed in the name of Stephen Todd et al. on Apr. 26, 2017 and entitled "Automated Assignment of Data Set Value Via Semantic Matching."

\* cited by examiner

PROCESSING PLATFORM CONFIGURED FOR DATA SET MANAGEMENT UTILIZING METADATA-BASED DATA SET OPERATIONAL SIGNATURES

FIELD

The field relates generally to information processing systems, and more particularly to processing of data sets in information processing systems.

BACKGROUND

Information processing systems are commonly configured for processing of data sets ingested into data lakes from a variety of different sources. However, in many situations, data sets are not managed in an efficient way. For example, data sets that could potentially facilitate analytic or operational workflows or otherwise provide improved performance in a given information processing system are often undiscovered, unutilized or underutilized. Moreover, manual intervention by an administrator is typically required in determining appropriate data set management operations for different types of data sets ingested from diverse sources.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

It should also be noted that illustrative embodiments can include, without limitation, apparatus, systems, methods, and computer program products comprising processor-readable storage media.

Figure 1:
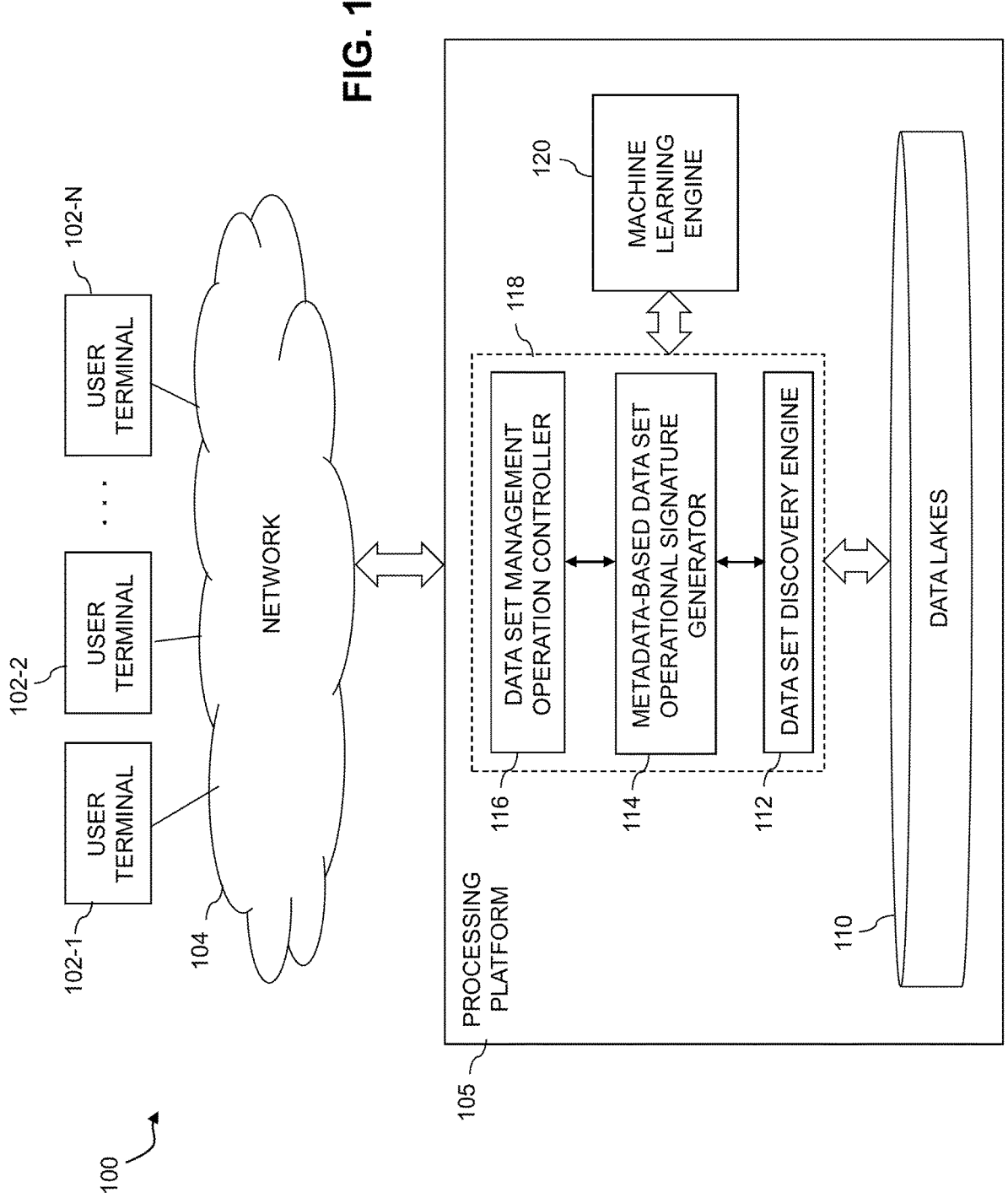
FIG. 1 is a block diagram of an information processing system implementing data set management functionality utilizing metadata-based data set operational signatures in an illustrative embodiment.

FIG. 1 shows an information processing system 100 configured in accordance with an illustrative embodiment. The information processing system 100 provides data set management functionality utilizing metadata-based data set operational signatures.

In this embodiment, the system 100 more particularly comprises a plurality of user terminals 102-1, 102-2, . . . 102-N coupled to a network 104. Also coupled to the network 104 is a processing platform 105 comprising a plurality of data lakes 110.

The user terminals 102 can comprise, for example, desktop, laptop or tablet computers, mobile telephones, or other types of processing devices capable of communicating with the processing platform 105 over the network 104. One or more of the user terminals 102 can each include at least one of a graphical user interface (GUI), an application programming interface (API) or another type of interface to one or more corresponding service interfaces of the processing platform 105 in order to support direct user access to data set management functionality within the system 100.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniB and, Gigabit Ethernet or Fibre Channel. Numerous alternative networking arrangements are possible in a given embodiment, as will be appreciated by those skilled in the art.

The processing platform 105 in the present embodiment comprises the above-noted data lakes 110 as well as a data set discovery engine 112, a metadata-based data set operational signature generator 114, and a data set management operation controller 116. The components 112, 114 and 116 collectively implement a data set management process 118 at least portions of which are directed by a machine learning engine 120.

The processing platform 105 is assumed to be implementing using one or more processing devices each having a processor coupled to a memory. Such processing devices can illustratively include particular arrangements of compute, storage and network resources. For example, the virtual resources can include virtual machines (VMs) or Linux containers (LXCs), or combinations of both as in an arrangement in which Docker containers or other types of LXCs are configured to run on VMs.

The data lakes 110 illustratively comprise one or more business data lakes or BDLs of a particular enterprise or group of enterprises. A given such data lake can comprise a combination of multiple distinct storage systems. These storage systems can implement databases including, for example, a NoSQL database such as MongoDB, a database utilizing Hadoop Distributed File System (HDFS) such as the HDFS databases supplied by Hortonworks or Cloudera, or other types of databases including Cassandra, HAWQ and Impala. A wide variety of other types of storage systems can be used. These storage systems are assumed to be part of the processing platform 105 in the present embodiment.

The term "processing platform" as used herein is intended to be broadly construed so as to encompass multiple sets of processing devices and associated storage systems that are configured to communicate over one or more networks. For example, distributed implementations of the processing platform 105 are possible, in which certain components of the platform reside in one data center in a first geographic location while other components of the platform reside in one or more other data centers in one or more other geographic locations that are potentially remote from the first geographic location. Thus, it is possible in some implementations of the system 100 for one or more of the data lakes 110 to reside in a different data center than the data set discovery engine 112 and other platform components. Numerous other distributed implementations of the processing platform 105 are possible.

Although components 112, 114 and 116 of the data set management process 118 are shown as being separate from the data lakes 110 in this embodiment, in other embodiments at least portions of one or more of these components may be implemented within a given one of the data lakes 110. Also, the components 112, 114 and 116 can be implemented in numerous alternative embodiments that do not involve the use of a data lake.

In operation, the processing platform 105 utilizes the components 112, 114 and 116 of the data set management process 118 to automatically perform one or more management operations for one or more data sets based at least in part on respective data set operational signatures generated for those data sets.

The data set discovery engine 112 is configured to obtain metadata characterizing a plurality of data sets from one or more of the data lakes 110 or from other sources internal or external to the processing platform 105.

The term "data set" as used herein is intended to be broadly construed. For example, a "data set" as the term is broadly used herein may be viewed, for example, as an abstraction of one or more data items, such as a table, a document, file, query result, set of key-value pairs, index, storage block contents, in-memory caches or other data item or combinations thereof, where the given data set is characterized by properties as well as relationships to other data sets. These properties and relationships are captured by metadata that is associated with the data set in the system 100. For example, metadata can be used to describe data set characteristics such as ownership, type, content, schema, classification, matchable patterns, text analytics characterizations, security classifications, provenance, usability, quality, ad hoc user tags, and many others. Metadata can additionally or alternatively include lineage or other history information relating to data sets, such as information indicating whether a given data set has been cleaned, transformed, filtered, tagged, merged, sampled or otherwise processed in a particular manner. These and a wide variety of other types of metadata suitable for use in illustrative embodiments herein can be stored in one or more metadata stores under the control of at least one metadata manager.

Additional details regarding exemplary data sets and metadata characterizing those data sets, as well as techniques for reasoning over such metadata and possibly also corresponding data set content, suitable for use in illustrative embodiments herein, can be found in U.S. Pat. No. 8,838,556, entitled "Managing Data Sets by Reasoning over Captured Metadata," and U.S. Pat. No. 9,141,908, entitled "Dynamic Information Assembly for Designated Purpose based on Suitability Reasoning over Metadata," both of which are incorporated by reference herein. Further details can be found in U.S. patent application Ser. No. 14/487,520, filed Sep. 16, 2014 and entitled "Data Set Virtual Neighborhood Characterization, Provisioning and Access," which is incorporated by reference herein. It is to be appreciated, however, that the data sets and reasoning techniques described in these references are considered examples only, and need not be utilized in other embodiments.

The metadata-based data set operational signature generator 114 is configured to generate data set operational signatures for respective ones of at least a subset of the data sets based at least in part on the obtained metadata.

The data set management operation controller 116 is configured to automatically perform one or more management operations for each of one or more of the data sets.

At least a subset of the data sets processed in the data set management process 118 are assumed to be controllably ingested into at least a portion of one or more of the data lakes 110 prior to, in conjunction with, or subsequent to generation of corresponding ones of the data set operational signatures.

Examples of data set management operations that are automatically performed for each of one or more of the data sets under the control of the data set management operation controller 116 of the data set management process 118 include one or more of the following:

1. Deploying a given one of the data sets for at least one of a particular purpose, a particular goal and a particular role in a process.

2. Processing a given one of the data sets in particular infrastructure elements.

3. Storing a given one of the data sets in a particular data store.

4. Archiving a given one of the data sets in a particular manner.

5. Migrating a given one of the data sets from one location to another.

6. Copying a given one of the data sets from one location to another.

7. Generating a usage recommendation for a given one of the data sets.

8. Implementing a data retention action for a given one of the data sets.

9. Implementing an auditing action for a given one of the data sets.

10. Limiting a permitted number of replicas of a given one of the data sets.

11. Utilizing a given one of the data sets for at least one of updating and replacing one or more other ones of the data sets.

These particular management operations are examples only, and numerous other types of management operations can be performed based at least in part on data set operational signatures in the system 100.

The data set management process 118 of the processing platform 105 is further configured to associate one or more confidence factors with a given one of the data set operational signatures, and to automatically perform one or more particular management operations for the corresponding data set only if the associated one or more confidence factors are above respective designated thresholds. The one or more confidence factors illustratively comprise a vector of one or more confidence factors each controlling automatic performance of a corresponding one of the one or more particular management operations in the data set management operation controller 116. For example, there may be lower confidence that a migration operation will be needed for a particular data set than that an audit operation will be needed for that data set. Accordingly, different confidence factors may be established for respective different management operations associated with a given one of the data set operational signatures. The multiple confidence factors are illustratively generated in conjunction with the corresponding data set operational signatures in the metadata-based data set operational signature generator 114.

It should be noted that references herein to confidence factors each "controlling" automatic performance of a corresponding one of the one or more particular management operations should not be considered limiting in any way. In other embodiments, confidence factors can exert other types of influence on automatic performance of management operations. For example, such factors can be considered with other factors of other types in conjunction with automatic performance of management operations.

Also, there need not be a one-to-one relationship between confidence factors of a given operational signature and management operations. For example, it is possible for one confidence factor of an operational signature to control or otherwise influence the performance of multiple management operations based on that operational signature. Also, multiple confidence factors may control or otherwise influence the performance of a single management operation. Accordingly, one-to-many or many-to-one relationships are possible among confidence factors and management operations of a given operational signature.

The data set management process 118 in the processing platform 105 may additionally or alternatively be configured to implement a target signature for a particular data set management policy, and to automatically perform a particular management operation for a given one of the data sets based at least in part on a result of a comparison of the data set operational signature for the given data set to the target signature. Such functionality is more particularly assumed to be part of the data set management operation controller 116.

The machine learning engine 120 of the processing platform 105 is configured to adjust at least one of the data set operational signature, the target signature and the data set management policy over time through machine learning based at least in part on user interaction with the given data set. Numerous other types of features and functionality of the components 112, 114 and 116 of the data set management process 118 can similarly be adjusted over time through machine learning implemented by machine learning engine 120. Additional examples of such machine learning will be described below in conjunction with FIG. 3.

The data set management process 118 of the processing platform 105 is illustratively configured such that one or more of the data set operational signatures are generated in the metadata-based data set operational signature generator 114 at least in part utilizing one or more data set similarity measures each relating a corresponding one of the plurality of data sets to one or more other ones of the plurality of data sets.

For example, the data set similarity measure for a given one of the data sets may comprise at least one of distance between the given data set and each of one or more other ones of the data sets and a relationship among the given data set and one or more other ones of the data sets. The one or more data set similarity measures may be generated at least in part by semantically examining a given data set using one or more semantic considerations derived from a semantic hierarchy of data sets and relationships to identify similar data sets. It should be noted that a "semantic hierarchy" is distinct from a "processing hierarchy" referred to in conjunction with the embodiment of FIG. 3 and other contexts herein.

The semantic examination performed in some embodiments is aligned with a predetermined semantic hierarchy of data items and relationships. For example, such a semantic hierarchy may be as follows:

Content of data sets→metadata→relationships→similarity→suitability

In this example, the elements of the semantic hierarchy are arranged from a lowest level to a highest level, with the data sets being at the lowest level and the suitability being at the highest level. Other types of semantic hierarchies can be used in other embodiments. An advantage of utilizing an explicit semantic hierarchy is that such an arrangement allows higher-level semantic considerations to be applied to searching for and retrieving data sets in the data set discovery engine 112.

The metadata-based data set operational signature generator 114 is illustratively configured such that operational signatures of data sets that are similar to a given data set are utilized to generate an operational signature for the given data set. However, many other arrangements are possible.

For example, various fields, properties, classifications or other characteristics of data set operational signatures can be used as similarity dimensions for identifying similar data sets in the data set discovery engine 112. Accordingly, the data set discovery engine 112 can utilize operational signatures previously generated for respective ones of the data sets by the metadata-based data set operational signature generator 114 to generate one or more of the data set similarity measures that are utilized in determining operational signatures for other data sets.

In such arrangements, one or more of the data set operational signatures are utilized in generating one or more data set similarity measures each relating a corresponding one of the plurality of data sets to one or more other ones of the plurality of data sets.

The data set discovery engine 112 in the present embodiment is therefore illustratively configured to utilize operational signatures as an additional data set attribute to be considered in identifying similar data sets.

Accordingly, embodiments herein contemplate that similar data sets may be identified prior to generation of operational signatures, and further that operational signatures may be used to identify similar data sets.

Additionally or alternatively, the generation of data set operational signatures may be controlled at least in part using data set virtual neighborhoods to define the scope of consideration of similar data sets. A given such data set virtual neighborhood in the present embodiment illustratively comprises a virtual grouping of a plurality of interrelated data sets determined at least in part based on one or more of metadata describing the data sets, content indexes related to the data sets, and content of the data sets.

Other types and configurations of data set virtual neighborhoods can be used in other embodiments. Additional details regarding data set virtual neighborhoods can be found in the above-cited U.S. patent application Ser. No. 14/487,520, entitled "Dataset Virtual Neighborhood Characterization, Provisioning, and Access."

In some embodiments, at least portions of the above-noted semantic hierarchy utilized by the data set discovery engine 112 to identify similar data sets are adjusted over time through the use of machine learning techniques implemented by the machine learning engine 120. Such machine learning techniques illustratively utilize feedback derived at least in part from user interaction with particular data sets and associated management operations. By way of example, machine learning or related approaches can be used to analyze dynamic changes in utilization of a given data set over all or part of the lifecycle to date of that data set. This can involve tagging data sets with their current position in the lifecycle or adjusting their operational signatures directly based on lifecycle position or history.

Machine learning can therefore be used to improve operational signature generation and associated management operation control given some representation of usage outcomes. These and other machine learning arrangements can involve generating revised operational signatures and/or usage statistics as well as other types of adjustments to various features of the data set management process 118.

As indicated previously, the metadata-based data set operational signature generator 114 is configured to generate an operational signature for a given data set, possibly at least in part as a function of operational signatures previously generated for respective other ones of the data sets that are determined by the data set discovery engine 112 to be sufficiently similar to the given data set. The similar data sets are illustratively identified as those data sets that exhibit at least a threshold similarity to the given data set based at least in part on corresponding ones of the similarity measures generated by the data set discovery engine 112. Weights may be associated with respective distinct similarity measures and applied to values of those measures in the similarity determination process.

The term "threshold" in this context and elsewhere herein is intended to be broadly construed so as to encompass a multi-dimensional threshold that potentially incorporates distinct dimensions associated with respective distinct ones of the above-noted semantic considerations derived from the semantic hierarchy of data sets and relationships. Comparison of a data set to such a threshold can therefore involve multiple comparisons along respective ones of the different dimensions of the threshold. As indicated previously, weights may be utilized when performing comparisons along multiple similarity dimensions.

In some implementations, the data set discovery engine 112 includes a data set indexer and a relativistic data set retriever. The relativistic data set retriever is configured to access a set of data set similarity algorithms. The data set indexer is configured to generate similarity indexes for a plurality of data sets, and the relativistic data set retriever is configured to obtain a suitability template for a query and to execute the query against one or more of the similarity indexes based at least in part on the suitability template.

The suitability template illustratively characterizes suitability for at least one of a particular purpose, a particular goal and a particular role in an analytic process or other type of process. The suitability template is associated with at least one target data set. The data set indexer may be configured to generate similarity indexes for a plurality of target data sets each associated with one or more suitability templates. The suitability template in some embodiments is characterized at least in part by operational signatures of respective data sets.

The relativistic data set retriever utilizes similarity indexes and associated relationships among data sets, as well as higher-order relationships including relationships among data set relationships themselves, in order to discover suitable data sets, possibly responsive to a query from the metadata-based data set operational signature generator 114.

A given index configuration of the data set indexer in this embodiment illustratively comprises similarity measures, suitability templates and other settings, although other types of index configurations can be used. The term "similarity index" as used herein is therefore intended to be broadly construed, and should not be interpreted as being limited to any specific indexing format.

It is to be appreciated, however, that other implementations of the data set discovery engine 112 need not include a data set indexer. For example, similarity between data sets may be dynamically computed in the data set discovery engine 112 using algorithms that do not involve indexing. A given implementation of data set discovery engine 112 may therefore comprise a relativistic data set retriever but not a data set indexer.

Information relating to the discovered data sets is utilized in conjunction with data set operational signature generation as implemented in the metadata-based data set operational signature generator 114. As mentioned previously, the operational signature generation process for a given data set can be performed using metadata relating to similar data sets. In arrangements of this type, it may not be necessary to retrieve the similar data sets themselves in order to perform the operational signature generation process for the given data set.

It should be noted in this regard that terms such as "retriever," "retrieve" and "retrieval" as used herein are intended to be broadly construed, and should not be viewed as requiring actual reading of a data set from a memory or other storage device. For example, in some embodiments, information characterizing one or more discovered data sets is provided by the relativistic data set retriever responsive to a query. Such characterizing information can include a pointer to a given data set, or other types of information sufficient to allow the data set itself or portions thereof to be read from a memory or other storage device, or otherwise obtained by a system entity that requires access to that data set.

The data set information provided by the relativistic data set retriever can therefore in some embodiments include a given data set itself, or one or more designated portions of the given data set, or metadata of the given data set. Accordingly, references herein to retrieval or retrieving of data sets by one system entity should be understood to encompass arrangements in which, for example, that entity provides information sufficient to allow another system entity to perform actual reading of at least a portion of the data set or its associated metadata from a memory or other storage device.

For example, in some embodiments, the metadata-based data set operational signature generator 114 can query the relativistic data set retriever of the data set discovery engine 112 to identify data sets that are similar to a given data set for which an operational signature is being generated. The relativistic data set retriever can return the similar data sets and/or associated metadata such as operational signatures previously assigned to respective ones of the similar data sets. The metadata-based data set operational signature generator 114 is configured to process those operational signatures, possibly using associated weights or other information relevant to the operational signature generation process, to calculate an operational signature that is assigned to the given data set.

It is also possible that the metadata-based data set operational signature generator 114 can adjust operational signatures previously generated for respective ones of the data sets. For example, at least a subset of the data set operational signatures can be dynamically recalibrated over time based at least in part in changes in usage of the corresponding data sets. Additionally or alternatively, the operational signatures can be adjusted based at least in part on current positions of respective data sets in their respective data set lifecycles. Numerous other factors may be used by the operational signal generator 114 in adjusting operational signatures.

Such adjustments illustratively utilize one or more machine learning tools implemented within the machine learning engine 120 of the processing platform 105. For example, machine learning functionality of the machine learning engine may be implemented at least in part utilizing a machine learning tool such as the Machine Learning Library (MLlib) of Apache Spark™. Machine learning in some embodiments utilizes principal component analysis, clustering, classification or other types of analysis of discovered data sets.

The processing platform 105 may be configured to utilize a blockchain distributed ledger to securely track such variations in the data set operational signatures. However, the use of a blockchain distributed ledger is not limited to secure tracking of variations in data set operational signatures. For example, the blockchain distributed ledger can additionally or alternatively track management operations that are automatically performed by the processing platform based at least in part on the operational signatures.

The data set discovery engine 112 is illustratively configured for efficient processing of graphs, data collections or other data sets comprising very large numbers of data items. Such data sets often contain substantial amounts of potentially actionable information that is not captured or effectively utilized by existing tools. This information illustratively includes metadata on data sets, content in data sets, explicit and implicit relationships among data sets, and rich descriptions of these relationships.

The data set discovery engine 112 incorporates a software architecture and methodology configured to support accurate, efficient and deep data set discovery based on such information, including in some embodiments recommendation of data sets, thereby facilitating the determination of particular data sets suitable for a given purpose, goal or analytic role, where the term "analytic role" in this context refers to a role in an analytic process. Data sets suitable for roles in other types of processes can additionally or alternatively be determined. The use of the term "analytic role" in conjunction with the description of certain embodiments herein should therefore not be construed as limiting in any way.

For example, in some embodiments, the data set discovery engine 112 is capable of discovering, ranking and clustering data sets according to their similarity to a target specification or suitability for a given purpose, goal or analytic role. Its architecture allows the use of weighted, pluggable similarity measures, either universally or in a domain-specific fashion. It treats data sets and relationships among them in a unified manner, while providing a scalable infrastructure for automated reasoning and performance of high-level analytical processing over the discovered results.

As a more particular example, a given embodiment of the data set discovery engine 112 is configured to identify data sets similar to a given target data set, to discover relationships among the data sets, and possibly relationships among relationships, and to recommend to the metadata-based data set operational signature generator 114 data sets suitable for a given purpose, goal or analytic role. The discovered data sets may be ranked by the degree of similarity to the target and this ranking is extended to suitability for the given purpose, goal, or role. Such an embodiment is further configured to support reasoning and analytics over the discovered results, treating data sets and relationships in a unified way, and to optimize, tune or otherwise adjust the similarity measures and their weightings based on utilization of data sets.

The suitability template in some embodiments is created from user-defined rules reflecting the purpose, goal or analytic role of required data sets. This may include, for example, identification of one or more appropriate training data sets for building analytic models. The suitability template can illustratively be viewed as a relativistic representation of one or more data sets. Suitability templates in some embodiments are configured to enable discovery of data sets that may need to be restricted due to regulatory or compliance issues. For example, data sets may need to be restricted because they contain personal identification information (PII) or personal health information (PHI). Discovery of such data sets can be achieved using direct, derived and higher-order relationships along with similarity measures. As a more particular example, a data set DS1 containing PII may be combined with one or more other data sets during an analysis process, producing a new data set DS2 that may be similar to the original DS1 by some similarity measures. It is very useful to know that DS2 is similar to DS1, since DS2 could then be restricted. The suitability aspect in this example, built on the underlying discovery of similarity of DS2 to DS1, is "suitability for tagging as sensitive content," which may lead to further restrictions on DS2 access and dissemination.

A wide variety of additional or alternative data set discovery functionality can be provided in other embodiments. Such data set discovery functionality implements semantic matching utilized to support automated generation of data set operational signatures. Additional details regarding semantic matching functionality that may be implemented in a data set discovery engine can be found in U.S. patent application Ser. No. 15/074,597, filed Mar. 18, 2016 and entitled "Data Set Discovery Engine Comprising Relativistic Retriever," which is incorporated by reference herein.

The above-described embodiments illustrate possible configurations of the components 112, 114 and 116 of the data set management process 118.

In these and other embodiments, the data set management process 118 is illustratively configured to perform a hierarchical mapping of data set similarity measures at a lower level of a hierarchy to management operations at a higher level of the hierarchy via the data set operational signatures at an intermediate level of the hierarchy. A more detailed example of such a processing hierarchy will be described below in conjunction with FIG. 3.

It is to be appreciated that the particular arrangement of system components illustrated in FIG. 1 is exemplary only, and that numerous other arrangements of components may be used in other embodiments.

For example, although illustratively shown as being part of the processing platform 105 in the FIG. 1 embodiment, system components such as 112, 114, 116 and 120 in other embodiments can be implemented at least in part externally to the processing platform 105. The processing platform 105 may have access to these or other system components over the network 104 or one or more other networks of system 100.

Also, in other embodiments, functionality described herein as being associated with particular components of the system 100 may be implemented at least in part using additional or alternative components of the system 100.

As mentioned previously, the information processing system 100 is assumed in the present embodiment to be implemented on a given processing platform comprising one or more processing devices. Such a processing platform can comprise various combinations of physical and virtual resources. Illustrative examples of such processing platforms that may be used to implement at least portions of the system 100 will be described in more detail below in conjunction with FIGS. 5 and 6. These and other processing platforms in some embodiments are implemented using cloud infrastructure.

Again, it should be understood that the particular sets of components implemented in the information processing system 100 as illustrated in FIG. 1 are presented by way of example only. In other embodiments, only subsets of these components, or additional or alternative sets of components, may be used, and such components may exhibit alternative functionality and configurations. Moreover, the particular implementation of the components 112, 114, 116 and 120 of the processing platform 105 in the FIG. 1 embodiment is illustrative only, and can be varied in other embodiments.

For example, other illustrative embodiments can be implemented in conjunction with a Data and Analytics Catalog (DAC) such as that provided as a component of the Analytic Insights Module from Dell EMC. Such embodiments can be configured to provide generation of metadata-based data set operational signatures and associated automated performance of management operations for respective data sets tracked by the DAC.

One or more APIs can be provided that permit an operational signature generator to determine operational signatures based on semantic matching as disclosed herein. Operational signature generation can occur before, during or after ingestion of data sets into an associated data lake or other storage system.

The DAC in embodiments of this type is configured to serve as an asset manager, keeping track of usage patterns, transformations and modifications for the data sets, as well as characterizations, tags, commentary, classifications, ratings and other information. Operational signatures are illustratively assigned to respective data sets by attaching operational signature metadata to the data set entry in the DAC.

As another example, other illustrative embodiments can be configured to implement metadata-based data set operational signature generation and associated automated performance of management operations for data sets in the context of data lake cross currents, as described in U.S. patent application Ser. No. 14/614,011, filed Feb. 4, 2015 and entitled "Integrating Compliance and Analytic Environments Through Data Lake Cross Currents," which is incorporated by reference herein.

These and other embodiments can be adapted for utilization in a wide variety of different information processing contexts, including health care, bioinformatics, financial services, telecommunications, and other contexts characterized by the need for automated performance of data set management operations based on accurate, efficient and deep data set discovery functionality.

Figure 2:
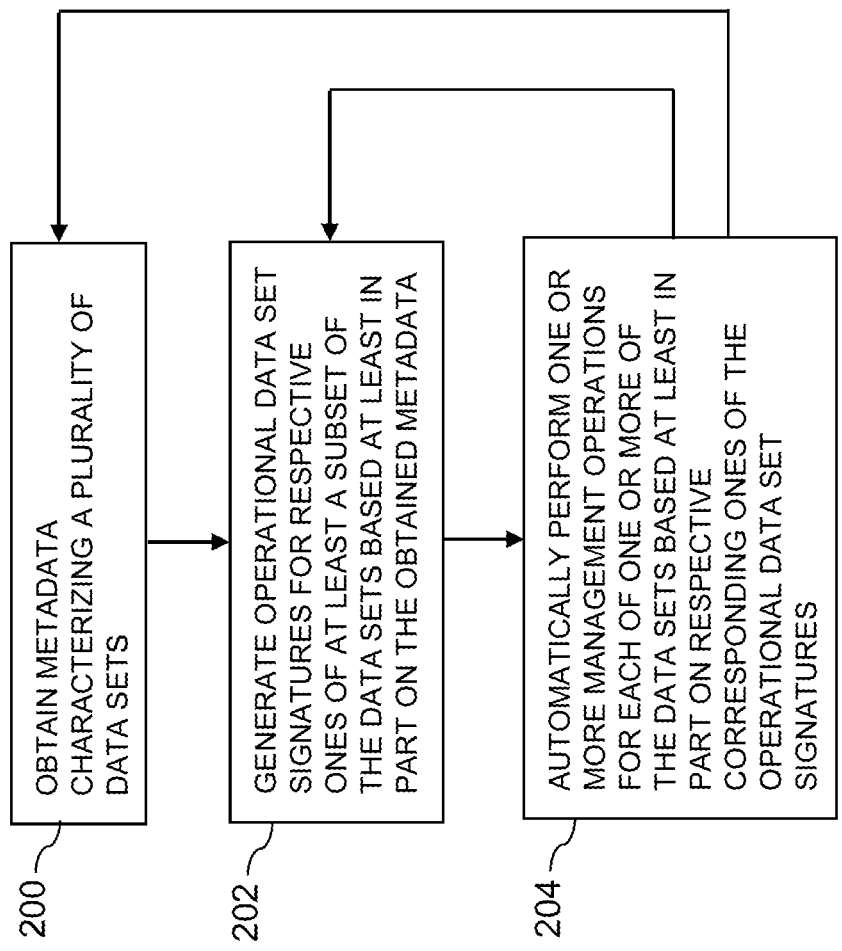
FIG. 2 is a flow diagram of an example process for data set management utilizing metadata-based data set operational signatures in an illustrative embodiment.

FIG. 2 shows a flow diagram of an example process for data set management utilizing metadata-based data set operational signatures in an illustrative embodiment. The process is illustratively performed by components 112, 114 and 116 of processing platform 105 in system 100, but could be performed by numerous other types of systems. The process as shown includes steps 200, 202 and 204, although wide variety of additional or alternative data set management processes can be used in other embodiments.

In step 200, metadata characterizing a plurality of data sets is obtained. For example, metadata characterizing one or more data sets that have been determined to exhibit a threshold level of similarity to one or more other data sets may be obtained utilizing the data set discovery engine 112 of processing platform 105.

In step 202, data set operational signatures are generated for respective ones of at least a subset of the data sets based at least in part on the obtained metadata. The operational signatures are illustratively generated in the metadata-based data set operational signature generator 114 of processing platform 105. This step may also involve associating one or more confidence factors with a given one of the data set operational signatures. Each such confidence factor can be associated with a different management operation that may be controllably performed for the given data set. However, as indicated previously herein, there need not be a one-to-one association between confidence factors and management operations. Accordingly, it is to be appreciated that a single confidence factor may be associated with multiple management operations, or multiple confidence factors may be associated with a single management operation, in some illustrative embodiments.

In step 204, one or more management operations are automatically performed for each of one or more of the data sets based at least in part on respective corresponding ones of the data set operational signatures. For example, one or more particular management operations may be automatically performed for the corresponding data set only if the associated one or more confidence factors are above respective designated thresholds. As indicated previously, the one or more confidence factors in such an arrangement thereby illustratively comprise a vector of one or more confidence factors each controlling automatic performance of a corresponding one of the one or more particular management operations associated with the data set operational signature. The automatic performance of one or more data set management operations in this step is illustratively controlled by the data set management operation controller 116 of processing platform 105.

The process of FIG. 2 can include additional steps. For example, the process can further include implementing a target signature for a particular data set management policy, and then automatically performing a particular management operation for a given one of the data sets based at least in part on a result of a comparison of the data set operational signature for the given data set to the target signature. Such steps are assumed to be implemented by cooperative interaction of the metadata-based data set operational signature generator 114 and data set management operation controller 116 of processing platform 105.

The particular processing operations and other system functionality described in conjunction with the flow diagram of FIG. 2 are presented by way of illustrative example only, and should not be construed as limiting in any way. Alternative embodiments can use other types and arrangements of processing operations for data set management utilizing metadata-based data set operational signatures. For example, the ordering of the process steps may be varied in other embodiments, or certain steps may be performed at least in part concurrently with one another rather than serially.

It is to be appreciated that functionality such as that described in conjunction with the flow diagram of FIG. 2 can be implemented at least in part in the form of one or more software programs stored in memory and executed by a processor of a processing device such as a computer or a virtual machine. A memory or other storage device having such program code embodied therein is an example of what is more generally referred to herein as a "processor-readable storage medium."

Additional illustrative embodiments of information processing systems configured to provide data set management functionality utilizing metadata-based data set operational signatures will now be described with reference to FIGS. 3 and 4.

Figure 3:
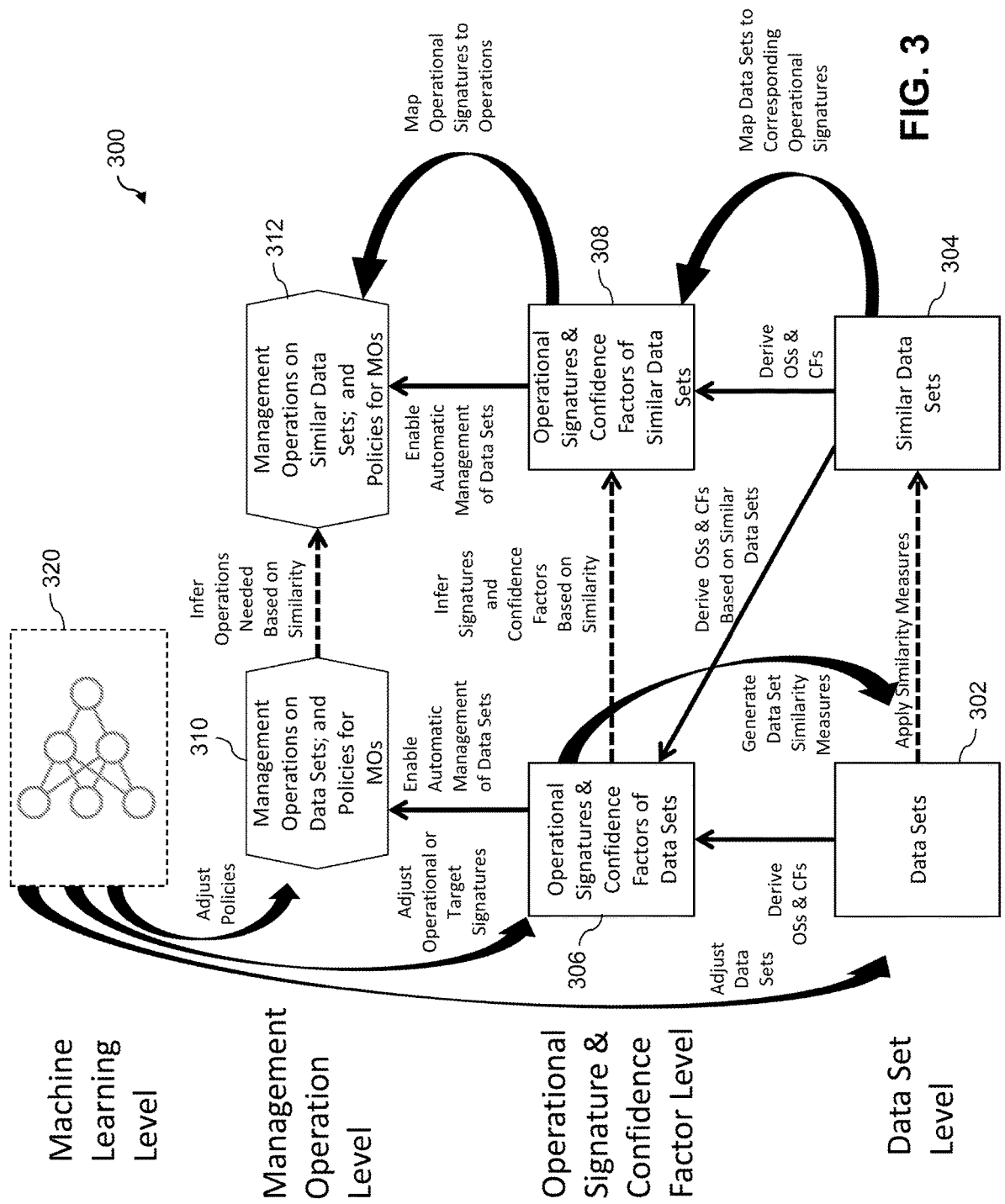
FIG. 3 shows an illustrative embodiment of an information processing system and associated processing flows implemented in an example processing hierarchy in which data set similarity measures at a lower level of the hierarchy are mapped to management operations at a higher level of the hierarchy via the data set operational signatures at an intermediate level of the hierarchy.

Referring initially to FIG. 3, an information processing system 300 comprises a processing hierarchy in which set similarity measures at a lower level of a hierarchy are mapped to management operations at a higher level of the hierarchy via the data set operational signatures at an intermediate level of the hierarchy. The processing hierarchy in this embodiment more particularly comprises a data set level, an operational signature and confidence factor level, a management operation level and a machine learning level, as illustrated in the figure. The data set level is the lowest level in this example hierarchy, and the machine learning level is the highest level.

Each of the data set level, the operational signature and confidence factor level and the management operation level implements similarity-based mapping in moving from respective components 302, 306 and 310 at the left side of the figure to respective components 304, 308 and 312 at the right side of the figure, as indicated by the horizontal dashed lines.

Movement between the data set level, the operational signature and confidence factor level and the management operation level also occurs, as indicated by the vertical solid lines. This movement is in an upward direction in the figure, between the data set level and the operational signature and confidence factor level, and between the operational signature and confidence factor level and the management operation level.

At the data set level, the information processing system 300 processes data sets 302 and applies similarity measures to determine similar data sets 304.

The data sets 302 are utilized to derive corresponding operational signatures and confidence factors ("OSs & CFs") 306 of those data sets at the operational signature and confidence factor level. In like manner, the similar data sets 304 are utilized to generate corresponding operational signatures and confidence factors 308 of those data sets at the operational signature and confidence factor level.

The similar data sets 304 may additionally be used in deriving at least portions of the operational signatures and confidence factors 306. Also, at least portions of the operational signatures and confidence factors 306 can be used in inferring at least portions of the operational signatures and confidence factors 308 based on similarity.

At the management operation level, data sets 302 are automatically managed by performance of management operations on those data sets in accordance with policies for the management operations, as indicated by reference numeral 310. Similar data sets 304 are automatically managed by performance of management operations on those data sets in accordance with policies for the management operations, as indicated by reference numeral 312. At least portions of the management operations and policies 310 can be used in inferring at least portions of the management operations and policies 312 based on similarity.

As noted above, mapping between levels is implemented in the FIG. 3 embodiment. For example, as illustrated generally by the upward-directed curved arrows at the far right side of the figure, such inter-level mapping in the present embodiment includes mapping of data sets 302 and 304 at the data set level to corresponding operational signatures and confidence factors 306 and 308 at the operational signature and confidence factor level, and mapping of operational signatures and confidence factors 306 and 308 at the operational signature and confidence factor level to corresponding management operations and policies 310 and 312 at the management operation level.

Machine learning engine 320 of the machine learning level can control various features of each of the underlying levels. For example, the machine learning engine 320 can adjust data set management policies at the management operation level, can adjust operational or target signatures at the operational signature and confidence factor level, and can adjust data set recommendations, classifications and associated metadata at the data set level, as illustrated generally by the downward-directed curved arrows exiting the machine learning engine 320 at the far left side of the figure.

Machine learning engine 320 can be configured to carry out additional or alternative functionality in the system 300. For example, as indicated previously herein, similar data sets may be identified prior to generation of operational signatures, while additionally or alternatively operational signatures may be used to identify similar data sets. To illustrate the latter approach, an additional curved arrow is directed from operational signatures and confidence factors 306 to data sets 302 and is associated with generation of data set similarity measures. The machine learning engine 320 can be configured to determine the most appropriate ordering of these two approaches in a particular processing context.

The various hierarchical levels of the processing hierarchy in the information processing system 300 of FIG. 3 are assumed to be implemented on one or more processing platforms such as processing platform 105 of system 100.

Figure 4:
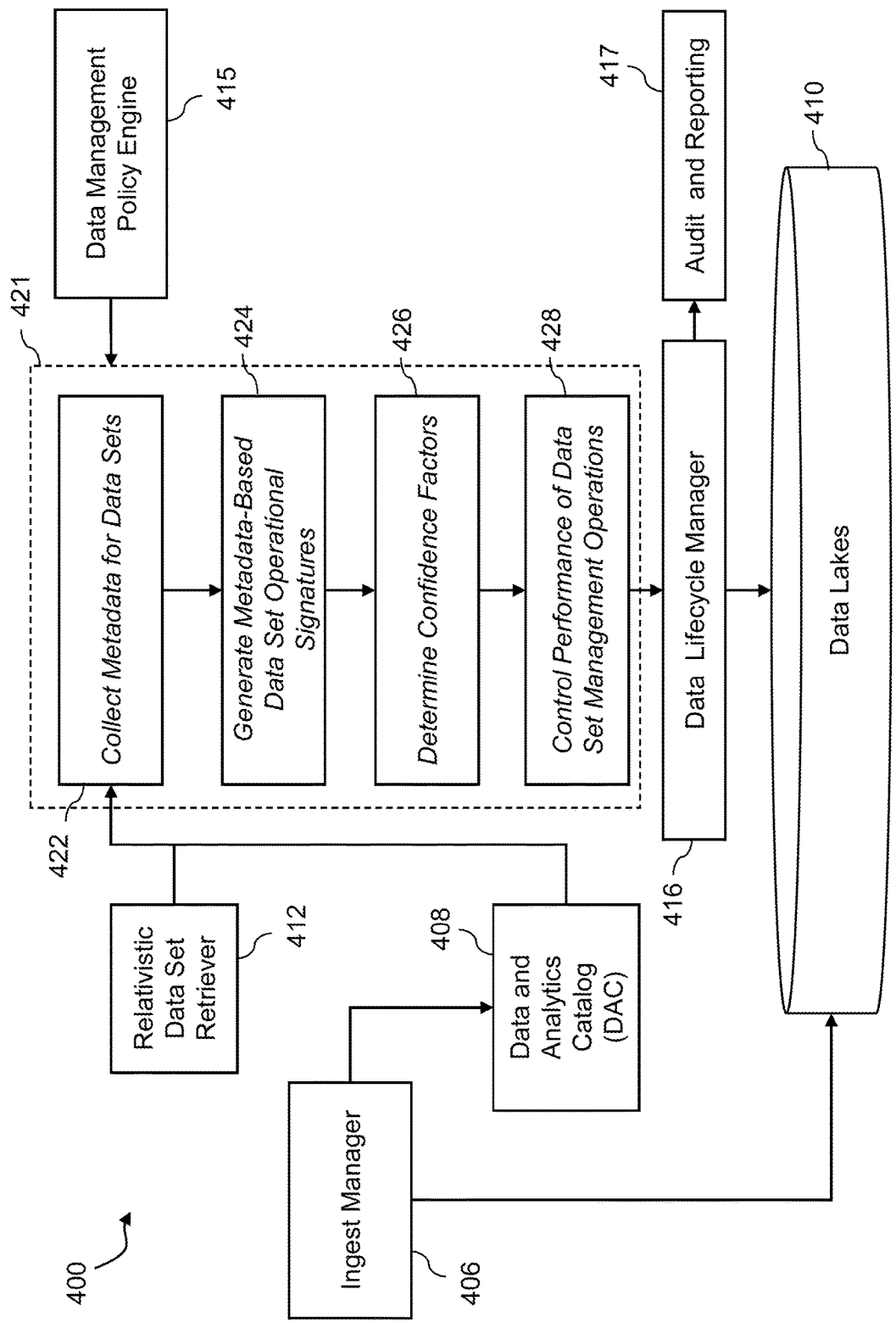
FIG. 4 shows another illustrative embodiment of an information processing system configured to provide data set management functionality utilizing metadata-based data set operational signatures.

Another illustrative embodiment is shown in FIG. 4. In this embodiment, an information processing system 400 comprises an ingest manager 406, a DAC 408, data lakes 410 and a relativistic data set retriever 412 of the type previously described above in the context of data set discovery engine 112.

The ingest manager 406 controls ingestion of data sets into the data lakes 410 and registers metadata for the ingested data sets in the DAC 408. For example, as data sets are ingested into one or more of the data lakes 410, APIs in ingest modules of the ingest manager 406 can capture, generate or otherwise obtain metadata for storage in the DAC 408. Such metadata illustratively describe structure and attributes of the data sets, including ownership, creation and ingestion dates, sources from which the data sets are captured, types of data set containers, provenance, security, context, size, sparseness, privacy level attributes, usability tags, etc. The metadata of the incoming data sets is stored in the DAC 408, which also tracks how the data sets are processed or otherwise utilized within the system 400. The DAC 408 in this embodiment serves as a data asset manager for the data lakes 410.

The relativistic data set retriever 412 utilizes a semantic hierarchy and one or more suitability templates to identify similar data sets. Its operation was described in detail elsewhere herein.

The system 400 further comprises a data management policy engine 415, a data lifecycle manager 416, and an audit and reporting module 417.

Also implemented in the system is a data set management process 421 that illustratively includes processing steps 422, 424, 426 and 428. The data management policy engine 415 provides input to the data set management process 421 generally as shown, and such input or portions thereof can be utilized by any or all of the constituent processing steps 422, 424, 426 and 428 of the data set management process 421.

Step 422 involves collecting metadata for data sets, and is illustratively performed by the DAC 408 and the relativistic data set retriever 412, utilizing management policy information provided by the data management policy engine 415.

Step 424 involves generating metadata-based data set operational signatures utilizing the metadata collected in step 422. The data set operational signatures are illustratively generated in a manner that limits the range of appropriate data management processing operation options based at least in part on similarity measures calculated by the relativistic data set retriever 412. A given operational signature can therefore associate one or more possible data set management operations with its corresponding data set. The operational signature of a given data set is determined at least in part based on the metadata collected at the time of ingestion of that data set. Data set management operations controlled via data set operational signatures are semantically correlated with data set similarities, possibly based at least in part on policy information provided by the data management policy engine 415.

Step 426 involves determining confidence factors for the data set operational signatures. As mentioned previously, each data set operational signature may include a corresponding confidence factor vector providing different confidence factors for each of a plurality of possible data set management operations. Again, as in other steps of the process 421, determination of confidence factors in step 426 may be based at least in part on policy information provided by the data management policy engine 415.

Steps 424 and 426 are illustratively performed by a metadata-based data set operational signature generator which is not explicitly shown in this figure but may be implemented on a common processing platform with other components of the system 400. The operational signatures and corresponding confidence factors are assumed to be generated in an automated manner in system 400 but in some embodiments can be validated or adjusted by an administrator or other system user.

Step 428 involves controlling performance of data set management operations utilizing the data set operational signatures and corresponding confidence factors generated in previous steps 424 and 426. This step may also make use of policy information provided by the data management policy engine 415.

Accordingly, in the system 400, data management policies provided by the data management policy engine 415 may play a role not only in determining similar data sets, but also in determining the type of operational signatures and confidence factors associated with the data sets, as well in determining the particular data set management operations that are performed based at least in part on the operational signatures and confidence factors.

As one possible example of the latter usage, assume that metadata providing creation date of a data set corresponds to a particular dimension in an operational signature generated at step 424. Policy information can indicate that a particular policy-driven management operation, such as following a designated regulation about preserving data, will be automatically performed if the creation date metadata falls within a specified range, and otherwise a different management operation, or possibly no management operation, will be performed.

The data set management process 421 as carried out for one or more of the data sets provides input to the data lifecycle manager 416, which can call additional instances of the data set management process 421 as needed for those data sets or other data sets of the system 400. The data lifecycle manager 416 can implement additional functionality, such as tracking state transitions for data sets and tagging data sets with information relating to lifecycle.

The audit and reporting module 417 captures information relating to the automated performance of management operations in system 400 from the data lifecycle manager 416. The resulting audit reports provide transparency in application and use of data management policies that are consistently enforced for similar data sets within the system 400.

The particular arrangements of system components in illustrative embodiments such as information processing systems 300 and 400 of respective FIGS. 3 and 4 are presented by way of example only, and can be varied in other embodiments.

Illustrative embodiments are configured to provide a number of significant features and advantages relative to conventional arrangements.

For example, illustrative embodiments provide consistent data set characterization for highly efficient implementation of management operations. More specifically, through the use of operational signatures and their associated confidence factors, metadata describing data sets is directly connected to particular management operations, thereby optimizing data management in a data lake.

As a result, data sets that could potentially facilitate analytic or operational workflows or otherwise provide improved performance in a given information processing system are more easily identified and exploited. Potentially valuable data sets are therefore far less likely to remain undiscovered, unutilized or underutilized within a given system.

In addition, the need for manual intervention by system administrators or other users is advantageously avoided. Illustrative embodiments can achieve fully automated metadata-based data set lifecycle management that improves itself over time through the use of machine learning techniques.

Illustrative embodiments also provide more consistent enforcement of data management policies within a given system, while avoiding the need to create separate automated processes for each distinct type of data set. For example, a common evaluation framework can be implemented across multiple distinct ingest points by using data set operational signatures to control performance of particular management operations. Uniform enforcement of data management policies is automatically achieved for similar data sets.

Accordingly, embodiments disclosed herein can more easily keep up with the ever-increasing pace of ingestion of data sets into a data lake from a wide variety of different data sources.

Furthermore, data set lifecycle management is considerably facilitated. For example, data management policies relating to migration, archiving and retention are much more easily enforced with performance of the corresponding management operations being controlled using data set operational signatures as disclosed herein.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment.

Cloud infrastructure as disclosed herein can include cloud-based systems such as an Amazon Web Services (AWS) system. Other examples of cloud-based systems that can be used to implement at least portions of system 100 include Google Cloud Platform (GCP) and Microsoft Azure. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments, such as the information processing systems 300 and 400 of respective FIGS. 3 and 4.

Figure 5:
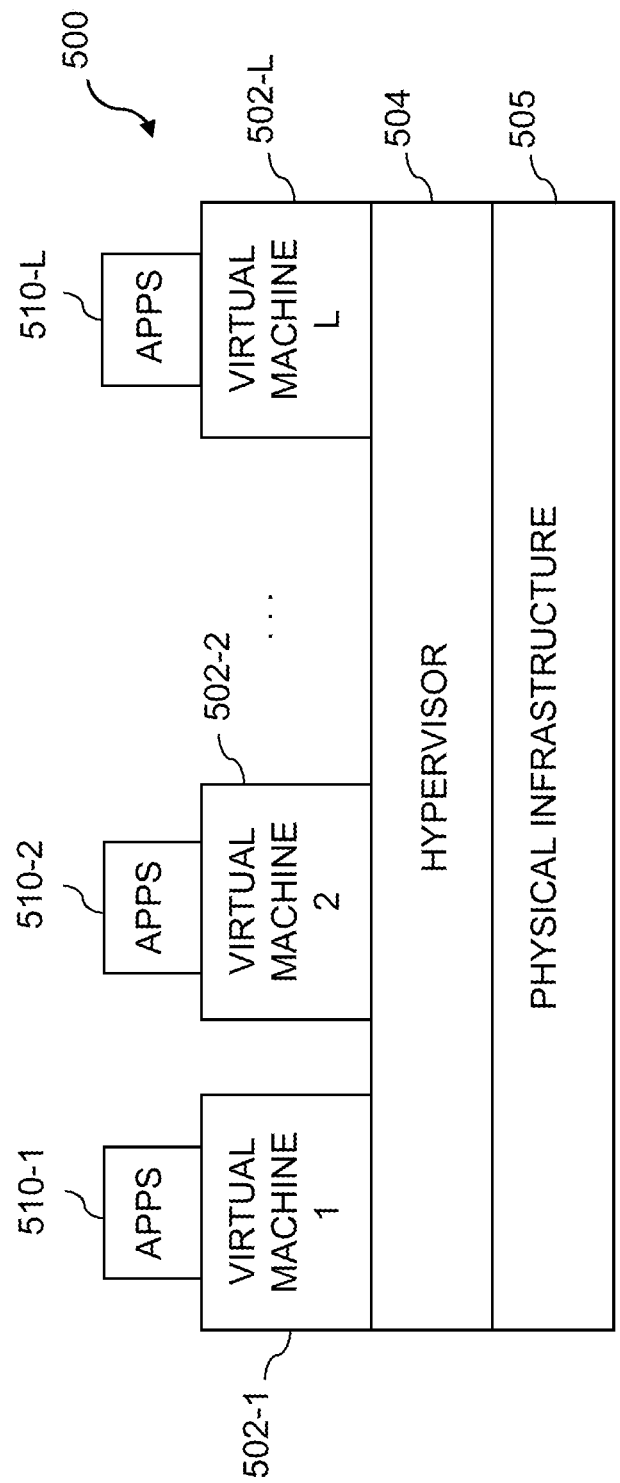
FIGS. 5 and 6 show examples of processing platforms that may be utilized to implement at least a portion of an information processing system in illustrative embodiments.
Figure 6:
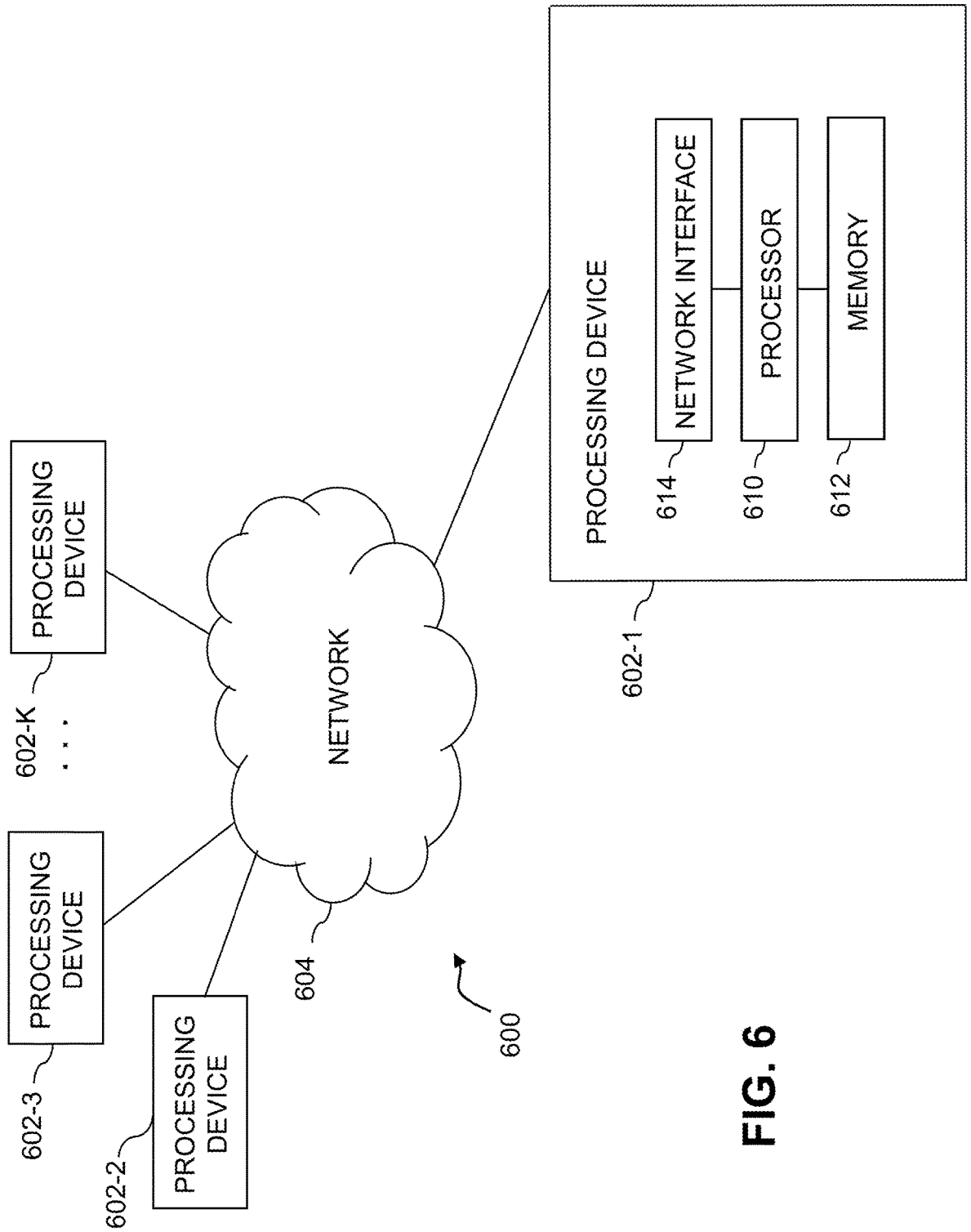

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

Although only a single hypervisor 504 is shown in the embodiment of FIG. 5, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a hypervisor platform that may be used to implement hypervisor 504 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

These and numerous other alternative cloud computing environments or other types of processing platforms can be configured to implement automated performance of data set management operations utilizing metadata-based data set operational signatures as disclosed herein.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of data set discovery engine 112, metadata-based data set operational signature generator 114 and data set management operation controller 116 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems in which it is desirable to provide data set management using metadata-based data set operational signatures. Also, the particular configurations of system and device elements shown in the figures can be varied in other embodiments. Thus, for example, the particular type of data set discovery, operational signature generation and management operation control components implemented in a given embodiment and their respective configurations may be varied. Other features of the illustrative embodiments such as similarity measures, suitability templates, operational signatures, confidence factors and processing hierarchies can also be varied. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a processing platform comprising one or more processing devices each having at least one processor coupled to a memory;
wherein the processing platform is configured:
to obtain metadata characterizing a plurality of data sets;
to generate data set operational signatures for respective ones of at least a subset of the data sets based at least in part on the obtained metadata;
to automatically perform one or more management operations for each of one or more of the data sets based at least in part on respective corresponding ones of the data set operational signatures;
to associate confidence factors with a given one of the data set operational signatures; and
to automatically perform particular management operations for the corresponding data set only if the associated confidence factors are above respective designated thresholds;
the confidence factors thereby comprising a vector of confidence factors each controlling automatic performance of a corresponding one of the particular management operations for the data set having the given data set operational signature; and
the processing platform being further configured:
to analyze changes in usage of the one or more data sets over all or part of respective lifecycles thereof;
to dynamically recalibrate at least a subset of the data set operational signatures over time based at least in part on the changes in usage of the corresponding data sets;
to implement a target signature for a particular data set management policy; and
to automatically perform a particular management operation for a given one of the data sets based at least in part on a result of a comparison of the data set operational signature for the given data set to the target signature;
wherein one or more of the data set operational signatures are generated based at least in part on one or more data set similarity measures each relating a corresponding one of the plurality of data sets to one or more other ones of the plurality of data sets;
wherein the one or more data set similarity measures are generated at least in part by semantically examining a given data set using one or more semantic considerations derived from a semantic hierarchy of data sets and relationships to identify similar data sets;
wherein the semantic hierarchy comprises a plurality of hierarchical levels comprising a data set level at a lowest level of the semantic hierarchy, a suitability level at a highest level of the semantic hierarchy, and one or more additional levels between the suitability level and data set level;
wherein the data set level characterizes content of the data sets and the suitability level characterizes suitability of the data sets for at least one of a particular purpose, a particular goal and a particular role in an analytic process;
wherein semantic considerations from one or more higher levels in the plurality of hierarchical levels are utilized for searching and retrieving data sets at one or more lower levels in the plurality of hierarchical levels; and
wherein the semantic hierarchy is adjusted over time based at least in part on analyzing dynamic changes in utilization of the data sets over at least a portion of lifecycles of the data sets through tracking of state transitions of the data sets, the data sets being tagged with their respective current positions in the lifecycles.

2. The apparatus of claim 1 wherein the processing platform further implements at least a portion of a data lake into which multiple ones of the data sets are controllably ingested prior to, in conjunction with, or subsequent to generation of corresponding ones of the data set operational signatures.

3. The apparatus of claim 1 wherein the one or more management operations that are automatically performed for each of one or more of the data sets comprise at least one of the following:
deploying a given one of the data sets for at least one of the particular purpose, the particular goal and the particular role in the analytic process;
processing a given one of the data sets in particular infrastructure elements;
storing a given one of the data sets in a particular data store;
archiving a given one of the data sets in a particular manner;
migrating a given one of the data sets from one location to another;
copying a given one of the data sets from one location to another;
generating a usage recommendation for a given one of the data sets;
implementing a data retention action for a given one of the data sets;
implementing an auditing action for a given one of the data sets;
limiting a permitted number of replicas of a given one of the data sets; and
utilizing a given one of the data sets for at least one of updating and replacing one or more other ones of the data sets.

4. The apparatus of claim 1 wherein the processing platform is further configured to adjust the data set operational signature, the target signature and the data set management policy over time through machine learning based at least in part on user interaction with the given data set.

5. The apparatus of claim 1 wherein the data set similarity measure for a given one of the data sets comprises at least one of distance between the given data set and each of one or more other ones of the data sets and a relationship among the given data set and one or more other ones of the data sets.

6. The apparatus of claim 1 wherein the data set similarity measures are generated by a data set discovery engine implemented by the processing platform, the data set discovery engine comprising:
a data set indexer configured to generate similarity indexes for the plurality of data sets; and
a relativistic retriever coupled to the data set indexer and configured to obtain a suitability template for a query and to execute the query against one or more of the similarity indexes based at least in part on the suitability template;
wherein the suitability template characterizes suitability for at least one of the particular purpose, the particular goal and the particular role in the analytic process; and
wherein the suitability template is associated with at least one target data set and further wherein the data set indexer is configured to generate similarity indexes for a plurality of target data sets each associated with one or more suitability templates.

7. The apparatus of claim 1 wherein the data set operational signature for a given one of the data sets is generated as a function of data set operational signatures previously generated for respective other ones of the data sets determined to exhibit at least a threshold similarity to the given data set based at least in part on corresponding ones of the similarity measures.

8. The apparatus of claim 1 wherein one or more of the data set operational signatures are utilized in generating one or more data set similarity measures each relating a corresponding one of the plurality of data sets to one or more other ones of the plurality of data sets.

9. The apparatus of claim 1 wherein the processing platform is further configured to perform a hierarchical mapping of data set similarity measures at a lower level of a processing hierarchy to management operations at a higher level of the processing hierarchy via the data set operational signatures at an intermediate level of the processing hierarchy.

10. The apparatus of claim 1 wherein the processing platform is further configured for:
  utilizing a blockchain distributed ledger to securely track variations in the data set operational signatures.

11. The apparatus of claim 1 wherein the one or more additional levels between the suitability level and the data set level comprise a metadata level characterizing metadata for the data sets.

12. The apparatus of claim 1 wherein the one or more additional levels between the suitability level and the data set level comprise a relationships level characterizing relationships between the data sets.

13. The apparatus of claim 1 wherein the one or more additional levels between the suitability level and the data set level comprise a similarity level characterizing similarity between the data sets.

14. A method comprising:
  obtaining metadata characterizing a plurality of data sets;
  generating data set operational signatures for respective ones of at least a subset of the data sets based at least in part on the obtained metadata;
  automatically performing one or more management operations for each of one or more of the data sets based at least in part on respective corresponding ones of the data set operational signatures;
  associating confidence factors with a given one of the data set operational signatures; and
  automatically performing particular management operations for the corresponding data set only if the associated confidence factors are above respective designated thresholds;
  the confidence factors thereby comprising a vector of confidence factors each controlling automatic performance of a corresponding one of the particular management operations for the data set having the given data set operational signature; and
  the method further comprising:
  analyzing changes in usage of the one or more data sets over all or part of respective lifecycles thereof;
  dynamically recalibrating at least a subset of the data set operational signatures over time based at least in part on the changes in usage of the corresponding data sets;
  implementing a target signature for a particular data set management policy; and
  automatically performing a particular management operation for a given one of the data sets based at least in part on a result of a comparison of the data set operational signature for the given data set to the target signature;
  wherein one or more of the data set operational signatures are generated based at least in part on one or more data set similarity measures each relating a corresponding one of the plurality of data sets to one or more other ones of the plurality of data sets;
  wherein the one or more data set similarity measures are generated at least in part by semantically examining a given data set using one or more semantic considerations derived from a semantic hierarchy of data sets and relationships to identify similar data sets;
  wherein the semantic hierarchy comprises a plurality of hierarchical levels comprising a data set level at a lowest level of the semantic hierarchy, a suitability level at a highest level of the semantic hierarchy, and one or more additional levels between the suitability level and data set level;
  wherein the data set level characterizes content of the data sets and the suitability level characterizes suitability of the data sets for at least one of a particular purpose, a particular goal and a particular role in an analytic process;
  wherein semantic considerations from one or more higher levels in the plurality of hierarchical levels are utilized for searching and retrieving data sets at one or more lower levels in the plurality of hierarchical levels;
  wherein the semantic hierarchy is adjusted over time based at least in part on analyzing dynamic changes in utilization of the data sets over at least a portion of lifecycles of the data sets through tracking of state transitions of the data sets, the data sets being tagged with their respective current positions in the lifecycles; and
  wherein the method is performed by a processing platform comprising one or more processing devices.

15. The method of claim 14 further including adjusting the data set operational signature, the target signature and the data set management policy over time through machine learning based at least in part on user interaction with the given data set.

16. The method of claim 14 wherein the one or more additional levels between the suitability level and the data set level comprise:
  a metadata level characterizing metadata for the data sets;
  a relationships level characterizing relationships between the data sets; and
  a similarity level characterizing similarity between the data sets.

17. A computer program product comprising a non-transitory processor-readable storage medium having one or more software programs embodied therein, wherein the one or more software programs when executed by at least one processing device cause said at least one processing device:
  to obtain metadata characterizing a plurality of data sets;
  to generate data set operational signatures for respective ones of at least a subset of the data sets based at least in part on the obtained metadata;
  to automatically perform one or more management operations for each of one or more of the data sets based at least in part on respective corresponding ones of the data set operational signatures;
  to associate confidence factors with a given one of the data set operational signatures; and
  to automatically perform particular management operations for the corresponding data set only if the associated confidence factors are above respective designated thresholds;
  the confidence factors thereby comprising a vector of confidence factors each controlling automatic performance of a corresponding one of the particular management operations for the data set having the given data set operational signature; and said at least one processing device being further configured:

to analyze changes in usage of the one or more data sets over all or part of respective lifecycles thereof;

to dynamically recalibrate at least a subset of the data set operational signatures over time based at least in part on the changes in usage of the corresponding data sets;

to implement a target signature for a particular data set management policy; and to automatically perform a particular management operation for a given one of the data sets based at least in part on a result of a comparison of the data set operational signature for the given data set to the target signature;

wherein one or more of the data set operational signatures are generated based at least in part on one or more data set similarity measures each relating a corresponding one of the plurality of data sets to one or more other ones of the plurality of data sets;

wherein the one or more data set similarity measures are generated at least in part by semantically examining a given data set using one or more semantic considerations derived from a semantic hierarchy of data sets and relationships to identify similar data sets;

wherein the semantic hierarchy comprises a plurality of hierarchical levels comprising a data set level at a lowest level of the semantic hierarchy, a suitability level at a highest level of the semantic hierarchy, and one or more additional levels between the suitability level and data set level;

wherein the data set level characterizes content of the data sets and the suitability level characterizes suitability of the data sets for at least one of a particular purpose, a particular goal and a particular role in an analytic process;

wherein semantic considerations from one or more higher levels in the plurality of hierarchical levels are utilized for searching and retrieving data sets at one or more lower levels in the plurality of hierarchical levels; and wherein the semantic hierarchy is adjusted over time based at least in part on analyzing dynamic changes in utilization of the data sets over at least a portion of lifecycles of the data sets through tracking of state transitions of the data sets, the data sets being tagged with their respective current positions in the lifecycles.

18. The computer program product of claim 17 wherein the one or more software programs when executed by said at least one processing device further cause said at least one processing device:

to adjust the data set operational signature, the target signature and the data set management policy over time through machine learning based at least in part on user interaction with the given data set.

19. The computer program product of claim 17 wherein the data set similarity measure for a given one of the data sets comprises at least one of distance between the given data set and each of one or more other ones of the data sets and a relationship among the given data set and one or more other ones of the data sets.

20. The computer program product of claim 17 wherein the one or more additional levels between the suitability level and the data set level comprise:

a metadata level characterizing metadata for the data sets;

a relationships level characterizing relationships between the data sets; and a similarity level characterizing similarity between the data sets.

* * * * *